(12) United States Patent
Petersen et al.

(10) Patent No.: US 6,939,300 B2
(45) Date of Patent: Sep. 6, 2005

(54) MULTIPLE LEVEL TRANSMITTER AND METHOD OF TRANSMITTING

(75) Inventors: David A. Petersen, Fall City, WA (US); Robert N. Phelps, Issaquah, WA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 235 days.

(21) Appl. No.: 10/078,690

(22) Filed: Feb. 19, 2002

(65) Prior Publication Data

US 2003/0158478 A1 Aug. 21, 2003

(51) Int. Cl.⁷ .............................................. A61B 8/00
(52) U.S. Cl. ..................................................... 600/437
(58) Field of Search ................................ 600/437, 443, 600/447, 458; 363/15–16, 23–25, 41, 43, 51, 37, 71, 124, 127; 330/73, 276; 323/301, 305, 308, 355; 310/314–317; 327/126–128

(56) References Cited

U.S. PATENT DOCUMENTS

| | | | | | |
|---|---|---|---|---|---|
| 3,579,081 | A | * | 5/1971 | Bates | 363/43 |
| 3,768,000 | A | * | 10/1973 | Bates | 363/72 |
| 4,032,832 | A | * | 6/1977 | Miller | 363/43 |
| 4,996,637 | A | * | 2/1991 | Piechnick | 363/16 |
| 5,027,265 | A | * | 6/1991 | Dhyanchand et al. | 363/37 |
| 5,177,460 | A | * | 1/1993 | Dhyanchand et al. | 336/12 |
| 6,050,945 | A | | 4/2000 | Peterson et al. | |
| 6,083,164 | A | | 7/2000 | Oppelt et al. | |
| 6,432,055 | B1 | * | 8/2002 | Carp et al. | 600/437 |
| 6,724,607 | B2 | * | 4/2004 | Hayashi et al. | 361/171 |

FOREIGN PATENT DOCUMENTS

| | | |
|---|---|---|
| DE | AS 1046679 | 12/1958 |
| DE | 44 07 369 A1 | 9/1995 |

* cited by examiner

*Primary Examiner*—Francis J. Jaworski

(57) ABSTRACT

Transmitters for generating multilevel transmit waveforms for medical diagnostic ultrasound are provided. Voltages from a plurality of sources are superposed or summed. Switches control the amplitude and polarity of the summed voltages so that a transmit waveform having four or more, such as nine, voltage levels is provided. A simple switching pulser without a power amplifier combines voltages applied to two or more flux paths in a third flux path. Superposition of magnetic flux in the third flux path provides for an output voltage responsive to the sum and difference of two different voltages. Alternatively or additionally, the secondary windings of multiple transformers are connected in series with a transducer element. By providing different input voltages to each of the transformers, the multilevel transmit waveform is generated.

23 Claims, 4 Drawing Sheets

MULTIPLE LEVEL TRANSMITTER AND METHOD OF TRANSMITTING

BACKGROUND

The present invention relates to generating waveforms. In particular, the invention relates to a transmit and receive circuit for an ultrasound system.

Short, high-energy transmit waveforms drive ultrasound transducers for diagnostic medical imaging. The transmit waveforms are generated by switching pulsers. Simple switching pulsers avoid dissipation associated with linear output amplifiers, but provide limited control of the transmit energy spectrum. For example, simple bipolar or unipolar waveforms are generated.

U.S. Pat. Nos. 6,083,164 and 6,050,945 disclose transmit and receive circuitry using switching pulsers. FIG. 14 of U.S. Pat. No. 6,083,164 discloses two switches S1, S2 connected to primary windings with a voltage source. The secondary winding of the transformer achieves a positive or negative voltage value for generating a bipolar waveform at the transducer element. With an extra primary winding, associated switches and different source voltage, different amplitude bipolar waveforms may be generated by the transformer. Since different voltages are used for each of the primary windings, bipolar waveforms with two different amplitudes may be generated. The flux path in the transformer is common to all of the windings, so bipolar waveforms responsive to only one of the two voltages are generated for any particular transmit pulse. A current biased diode bridge bypasses the transformer for reception of echo information.

More complex transmit waveforms with controlled energy spectrums are generated with the transmit beam former of U.S. Pat. No. 5,675,554. A digital to analog converter generates a complex multilevel waveform, such as a multiple cycle sinusoidal waveform with a Gaussian envelope. An amplifier is provided after the digital to analog converter. A linear amplifier with high-powered dissipation is used to preserve the desired high-power waveform.

BRIEF SUMMARY

The present invention is defined by the following claims, and nothing in this section should be taken as a limitation on those claims. By way of introduction, the preferred embodiments described below include methods and transmitters for generating multilevel transmit waveforms. Different voltages are superposed or summed. Switches control the amplitude and polarity of the summed voltages so that a transmit waveform having more than two voltage levels is provided.

A simple switching pulser without a power amplifier combines magnetic flux applied to two or more flux paths in a third flux path. Superposition of magnetic flux in the third flux path provides for an output voltage responsive to two different voltages applied to the first and second flux paths. The ratio of the number of turns on the output winding to the number of turns on the input windings can additionally be utilized to scale the output voltage up or down.

Alternatively or additionally, the secondary windings of multiple transformers are connected in series with a transducer element. The multilevel transmit waveform is generated in response to input voltages of each of the transformers.

Further aspects and advantages of the invention are discussed below in conjunction with the preferred embodiments.

BRIEF DESCRIPTION OF SEVERAL VIEWS OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

A multilevel transmit waveform or pulse, such as a waveform with three, four or more non-zero amplitudes, is generated by superposition of a plurality of input voltages. In one embodiment, a transformer with three or more magnetic flux paths superposes magnetic flux in one of the paths from the plurality of other paths. In another embodiment, voltages generated at secondary windings of a plurality of transformers connected in series are summed. The superposition of either embodiment provides a multilevel output transmit waveform.

Figure 1A:
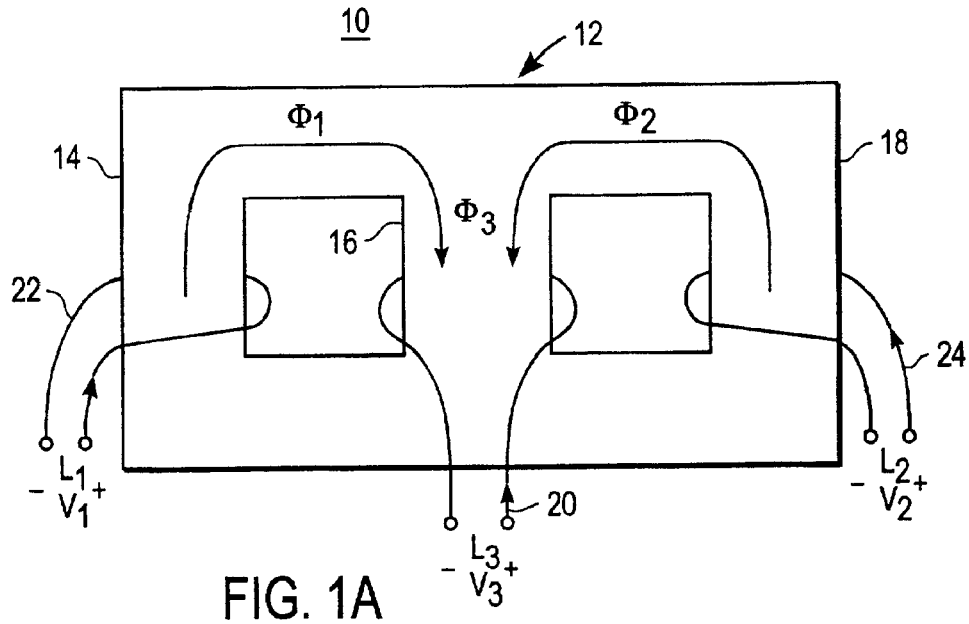
FIG. 1A is a front view of a transformer of one embodiment.

FIG. 1A shows a transformer of one embodiment for superposing magnetic flux. To generate a transmit pulse in response to a fixed set of input levels, the transformer 10 includes a ferrite core 12 with three or more separate flux paths 14, 16, 18, a secondary winding 20, and primary windings 22 and 24. Additional, different or fewer windings and flux paths may be provided.

The core 12 comprises a ferrite core or other magnetic core material. For example, a Siemens Corporation RM4LP-T 38 ferrite core is used, but other core materials by the same or other manufacturers with the same or different shapes may be used. Other core materials are described in U.S. Pat. Nos. 6,083,164 and 6,050,945, the disclosures of which are incorporated herein by reference. The core 12 is a low profile or small device for integration with other circuitry, but larger cores 12 may be used.

The ferrite core 12 forms three flux paths 14, 16 and 18. The flux paths 14, 16, 18 are of any of various same or different shapes and sizes. In one embodiment, each of the flux paths 14, 16 and 18 comprises a round or square cross-sectional shape for easy winding of wires.

The two primary windings 22 and 24 are wound around separate flux paths 14 and 18, respectively. The primary windings 22, 24 comprise copper or other conductors wound around the flux paths 14, 18 of the core 12 with one or more turns. The voltages applied to the primary winding 22, 24 control the direction and amplitude of magnetic flux $\Phi_1$ and $\Phi_2$. The voltages are of the same or different voltage levels and polarities. In one embodiment, each of the voltages for the primary windings 22, 24 are ternary (+,−,0) and are each responsive to four on-off switches and two separate windings on the same flux path.

The secondary winding 20 comprises a copper or other conductive material wound around the third flux path 16. The secondary winding 20 is wound one or more turns around the flux path 16. A voltage is generated at the secondary winding 20 in response to magnetic flux $\Phi_3$ through the flux path 16. The magnetic flux $\Phi_3$ of the flux path 16 is responsive to the magnetic flux $\Phi_1$ and $\Phi_2$ of the flux paths 14 and 18. For example, the magnetic flux responsive to the primary windings 22 and 24 is summed at the flux path 16. The voltage at the secondary winding 20 is approximately the turns-weighted sum of the input voltages of the primary windings 22 and 24. By providing separate flux paths 14, 18 for the primary windings 22, 24 through the flux path 16 for the secondary winding 20, a superposition or combination of different primary voltages provides a multilevel output voltage. The winding ratios between the primary and secondary windings 22, 20, 24 controls the superposition or summation weighting functions for the output voltage.

Figure 2:
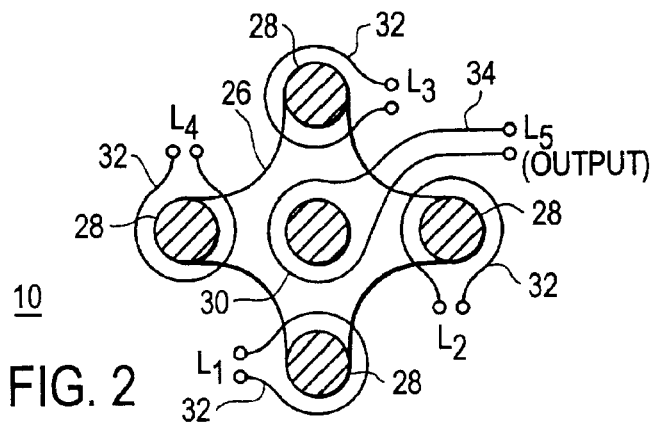
FIG. 2 is a cross-sectional top view of a transformer of another embodiment.

FIG. 2 shows an alternative embodiment of the transformer 10. A ferrite core 26 has five flux paths 28, 30. Alternatively, 4, 6 or more flux paths are provided. Primary windings 32 are wound around four of the flux paths 28. A secondary winding 34 is wound around one of the flux paths 30, such as a center flux path. By controlling the voltages of the primary windings 32, a voltage responsive to the primary windings 32 is generated on the secondary winding 34. The voltage at the secondary winding 34 is a turns-weighted superposition of the voltages on the primary windings 32. Magnetic flux is generated in the flux path 30 in response to the magnetic flux of the other flux paths 28.

Figure 1B:
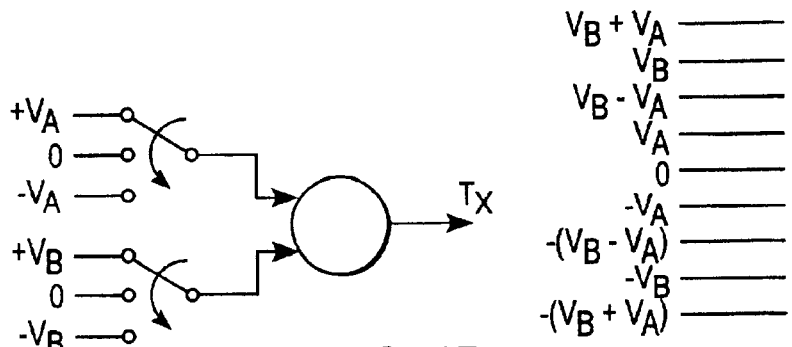
FIG. 1B is switching diagram of one embodiment for controlling the transformer of FIG. 1A.

The transformer 10 of FIG. 1A is operable to provide four positive, four negative and a zero level output voltage V3 given two different ternary input voltages V1 and V2. Using binary switching to provide either a positive, negative or zero level voltage at each of the primary windings 22, 24, a multilevel transmit waveform is generated with nine different voltage levels. For example, providing +Va, −Va or 0 to primary winding 22 and +Vb, −Vb, or 0 to primary winding 24, the output winding V3 can achieve nine distinct levels as shown in FIG. 1B. By choosing Va and Vb in a 1:3 ratio, the nine output levels are evenly spaced. However, other choices of Va:Vb can be used to advantage to obtain unevenly spaced output levels. For example, a 7-level evenly-spaced output is provided with Va:VB=1:2 and where the subtraction modes are not utilized. With the transformer 10 of FIG. 2 using different voltage levels for each of the primary windings 32, 81 different output voltage levels are possible. In general, a transformer with N primary windings (each on a separate flux path) can provide $3^N$ output levels since each primary can assume three possible states (+,−, and 0).

Figure 3:
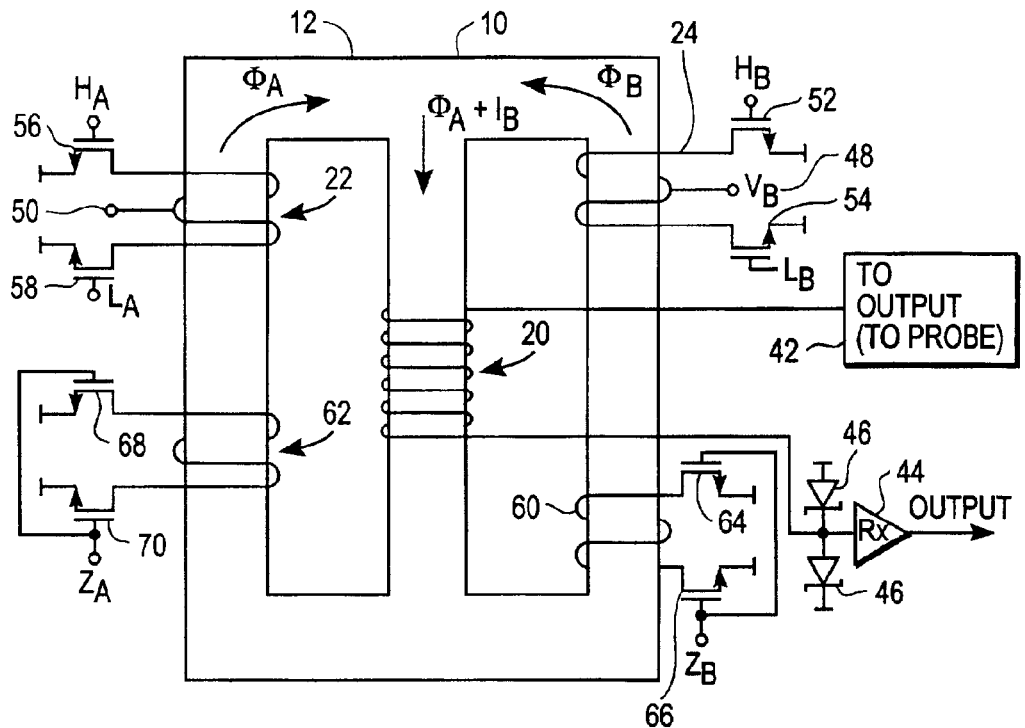
FIG. 3 is circuit diagram of a transmitter and receiver circuit of one embodiment using the transformer of FIG. 1A.

FIG. 3 shows one embodiment of a transmitter and receiver circuit 40 using the transformer 10. The circuit 40 includes the transformer 10, an ultrasound transducer element 42, a receive path including diodes 46 and receive amplifier 44, two voltage sources 48, 50 and a plurality of switches 52, 54, 56, 58, 64, 66, 68 and 70. Additional, different or fewer components may be provided. In this embodiment, additional windings 62 and 60 are provided on the same flux paths as windings 22 and 24 respectively to provide the zero level state for each primary.

The ultrasound transducer element 42 comprises a piezoelectric or electrostatic element. The element 42 is a single element used alone or as part of an array of elements. Alternatively, the element 42 represents two or more transducer elements. Additional components may be provided between the transformer 10 and the ultrasound element 42, such as a filter, tuning inductor, or routing switch.

The receive amplifier 44 and diodes 46 receive electrical signals from the transducer element 42 representing acoustic echo signals. The amplifier 44 outputs receive signals for beam formation or other processes. In alternative embodiments, different configurations or components are used to connect as a receive path to the transducer element 42.

The transformer 10 includes three separate flux paths. A secondary winding 20 is wound around one flux path. A primary winding 24 and a zero voltage winding 60 are wound around a second flux path, and another primary winding 22 and zero voltage winding 62 are wound around another of the flux paths. The secondary winding 20 is connected in series between the transducer element 42 and the receive amplifier 44. The secondary winding 20 is shown as having six turns, but any number of turns may be provided. The primary windings 22 and 24 are shown as having two turns but any number of turns may be used. The number of turns for one primary winding 22 is the same or different as the number of turns for the other primary winding 24. Opposite ends of each of the primary windings 22, 24 connect with one of the switches 52, 54, 56, 58.

The switches 52, 54, 56, 58 are transistors, such as field effect transistors, but other transistors, integrated switches, or analog switches may be used. In response to a control signals, L, H, the switches 52, 54, 56, 58 connect or disconnect the primary windings 22, 24 to ground. The control signals L, H, Z are provided from logic devices, such as a field programmable gate array, an application specific integrated circuit, digital signal processor, other processor or combinations thereof for controlling the circuit 40. The logic controllers are programmed or designed to operate the circuit 40 for beam-to-beam control of the transmit waveform.

Each of the primary windings 22, 24 is tapped by a voltage source 48, 50. The voltage sources 48, 50 are comprised of analog power supplies, transformers, voltage dividers, batteries, capacitors or other sources of voltage. The voltage sources 48, 50 tap to a center of the primary windings 22, 24, but non-centered or offset taps may be used. The voltage sources 48, 50 for each flux path of the transformer 10 provide a same or different voltage. For example, the voltage, $V_2$, of the voltage source 48 is twice or three times the voltage, $V_1$, of the other voltage source 50. By connecting the switch 54 to ground, a voltage is provided on the primary winding 24 between the voltage source 48 and ground producing flux in one polarity. When the switch 52 connects the primary winding 24 to ground, a voltage is provided on the primary winding 24 producing flux in the opposite polarity. When both switches 52 and 54 are open, no voltage driven current flows through the primary winding 24 and this winding does not contribute to the flux in this path. The switching of the other primary winding 22 operates in a similar manner. Accordingly, each of the primary windings 22, 24 is operable to provide a positive, negative or a no contribution to the flux in its respective path in response to the opening or closing of switches 52, 54, 56, 58 and the voltage of the voltage sources 48, 50.

The zero voltage windings 60, 62 are provided around each of the same flux paths as the primary windings 22, 24. Zero voltage windings include a same number of turns as the associated primary winding 22, 24, but a different number of turns may be used. Zero voltage windings 60, 62 are untapped. For example, no voltage source connects with the zero voltage windings 60, 62. Alternatively, a voltage source is connectable to both ends of the zero voltage winding.

One or more switches 64, 66, 68, 70 connect with each of the zero voltage windings 60, 62. The switches 64, 66, 68, 70 are field effect transistors, but other transistors, integrated circuits or other switching devices may be used. The switches 64, 66, 68, 70 connect or disconnect opposite ends of the zero voltage windings 60, 62 to ground. The control signal Z opens or closes the switches 64, 66, 68 and 70. As an alternative to connecting the zero voltage windings 60 and 62 to ground, the switches 64 through 70 connect the zero voltage windings 60, 62 to a same voltage or potential source.

The switches 64, 66, 68, 70 are closed in response to the control signal Z when a zero voltage is desired at the corresponding primary winding 22, 24. This zero drive state avoids generating undesired flux signals by forcing the flux to be zero in their respective paths, such as during a receive mode of operation or while a particular primary winding 22, 24 is not providing voltage to the secondary winding 20. The zero volt drive state prevents magnetic flux from being generated or flowing through the path for a proper superposition of flux at the secondary winding 20. The zero drive state is activated with minimal power consumption and avoids the necessity of a diode bridge or other diodes. In alternative embodiments, diodes including a diode bridge may be provided.

Figure 4:
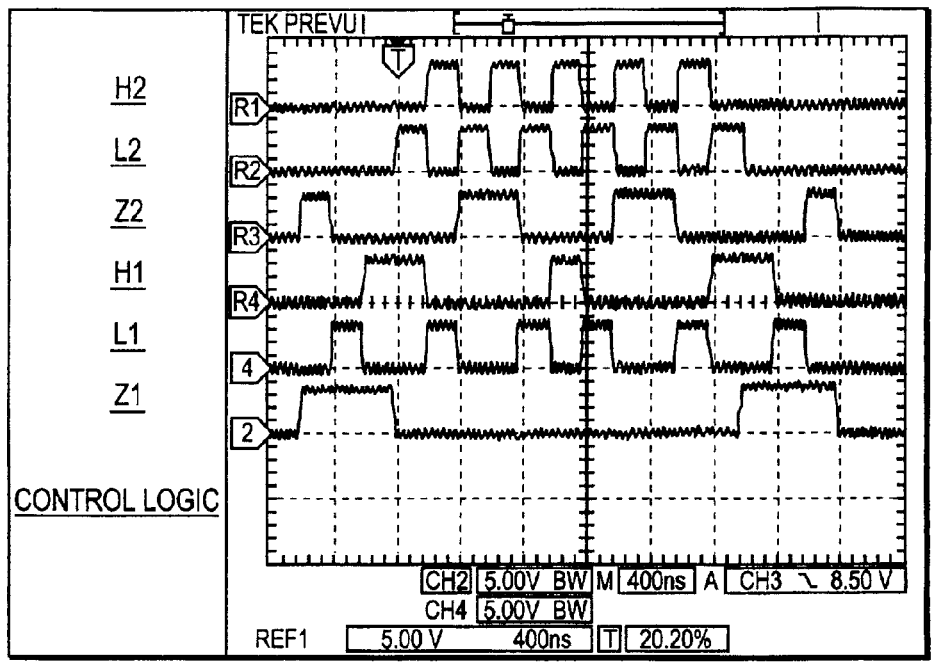
FIG. 4 is a graphical representation of control signals of one embodiment for operating the transmitter of FIG. 3.
Figure 5:
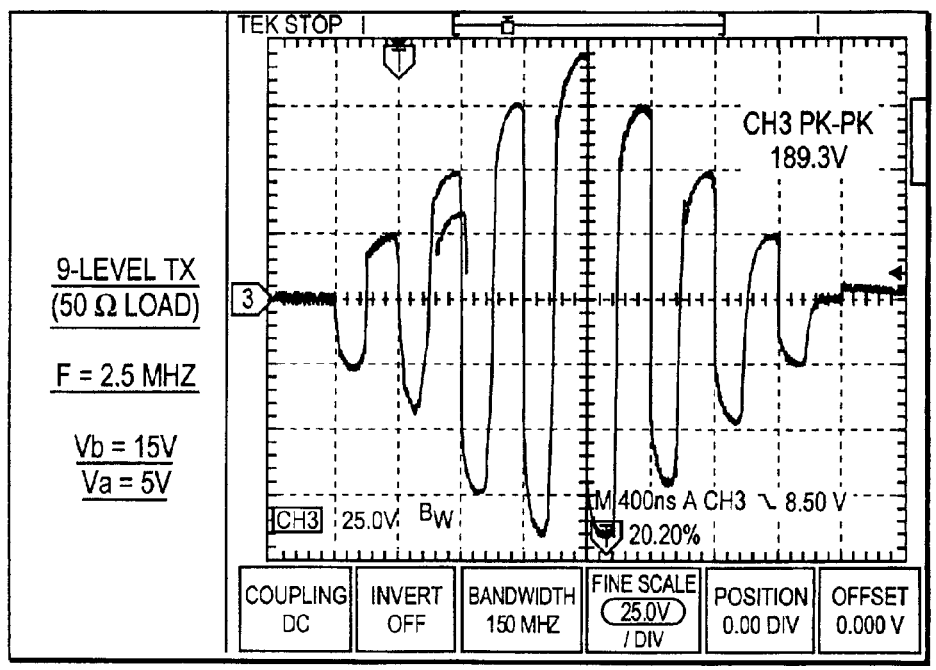
FIG. 5 is a graphical representation of a transmit waveform generated in response to the control signals of FIG. 4.

A multilevel transmit waveform is generated by the circuit 40 in response to the switch control signals L, H and Z. FIG. 4 shows the control signals for generating a multilevel transmit waveform shown in FIG. 5. FIGS. 4 and 5 assume the operation of circuit 40 with the voltage of the voltage source 48 as three times the voltage of the voltage source 50. Both voltage sources 48, 50 are tapped at the center of each of the two turn primary windings 22 and 24. Positive voltages are generated in response to $H_1$ and $H_2$ control signal at each of the primary windings 22, 24 respectively. Negative voltages of the same amplitudes are generated in response to each of the $L_1$ and $L_2$ control signals at each of the primary windings 22, 24, respectively.

When one of the primary windings 22, 24 is not generating a positive or negative voltage (e.g. L and H signals off or low), the Z signal is high to drive the zero voltage state of the zero voltage windings 60, 62. For operation with reception of echo signals, the Z signal is maintained on or high during that time period. The Z control may be pulsed on between non-zero drive states or during positive and negative output transitions to effect the rise and fall times of the output, but may be left low or off when the associated primary winding switches 52, 54, 56 and 58 are being used to generate the transmit waveform.

Using binary control as shown by the off/on states of the L, H and Z signals, a multilevel transmit waveform of FIG. 5 is generated. An initial positive and negative cycle of the transmit waveform is generated by switching $L_1$ on for a first half cycle and $H_1$ for a second half cycle. Accordingly, $Z_2$ is on and $L_2$ and $H_2$ are off during generation of the first cycle of the transmit waveform. The voltage peaks of the first cycle of the transmit waveform corresponds to the voltage level $V_1$ of the voltage source 50. The second cycle of the transmit waveform is generated by first turning L2 and H1 on and L1 and H2 off for half of the period, and then inverting this logic during the second half of the period. $Z_1$ and $Z_2$ are off during the entire second cycle. The voltage levels during the second cycle are proportional to the difference in voltages for source 50 and 48 and are typically twice the amplitude of the first cycle (assuming a 1:3 Va:Vb ratio). The third cycle of the transmit waveform is generated by the primary winding 24 using the control signals $L_2$ and $H_2$. Accordingly, $Z_1$ is on and $L_1$ and $H_1$ are off during generation of the third cycle of the transmit waveform. For a first negative going half cycle, $L_1$ is switched high during the half cycle, and for the positive going second half cycle, $H_2$ switched high. The voltage peaks for the third cycle of the transmit waveform are proportional to voltage source 50 and are typically three times the amplitudes of the first cycle, corresponding to the voltage level of the voltage source 48 (assuming a 1:3 Va:Vb ratio). The amplitude of the fourth cycle of the transmit waveform is higher than the previous cycles, such as being equal to the sum of the voltages at both voltage sources 48, 50. Since both primary windings 22, 24 are used for the fourth cycle of the transmit waveform, both zero drive states are turned off as represented by $Z_1$ and $Z_2$ being low or off. For the first negative going half cycle, $L_1$ and $L_2$ are both switched on during a same time period. During the positive going half cycle, $H_1$ and $H_2$ are both switched on at a same time. As shown in FIGS. 4 and 5, the remaining cycles of the transmit waveform are generated in a similar manner as the first second and third cycles. Fewer or greater number of cycles may be provided and the starting and ending half cycles can either be of the same polarity (as shown in FIG. 5) or of opposite polarity.

The transmit waveform of FIG. 5 is generated in response to two different voltages at two different primary windings 22, 24 and the superposition of magnetic flux at the secondary winding 20. Additional amplitude levels may be generated by providing additional primary windings and flux paths and/or further control over the voltages at the primary windings 22, 24. As shown in FIG. 5, nine voltage levels including the zero voltage level are provided. The transmit waveform of FIG. 5 is generated by adding and subtracting the two source voltages 48 and 50.

In alternative embodiments, fewer amplitude levels are provided by only adding positive voltage levels with positive voltage levels and negative voltage levels with negative voltage levels. Accordingly, the control for subtracting one voltage level from another is not used. Each level corresponds to a peak voltage during a half cycle or other portion of the transmit waveform. Using any combination of adding or subtracting voltage levels, three or more non-zero, different peak amplitudes are provided.

Figure 6:
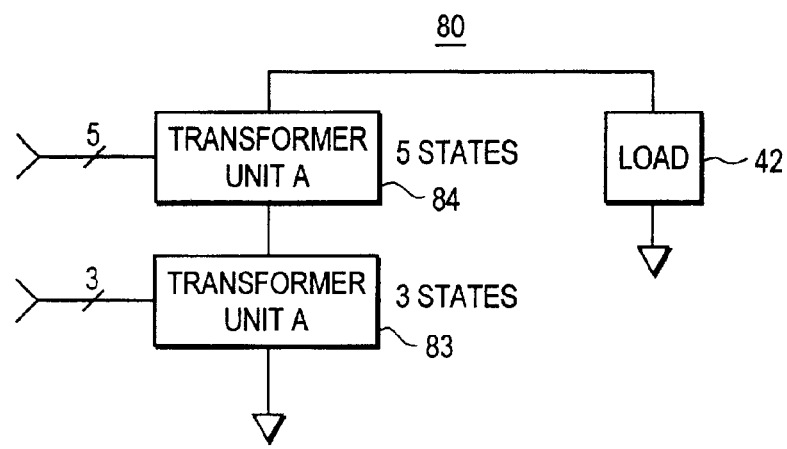
FIG. 6 is a block diagram of one embodiment of a plurality of transformers connected in series with a transducer element.

In addition to or as an alternative to summation of voltages through superposition of magnetic flux, voltages applied to a transducer element 42 are superposed by transformers positioned in series with the transducer element 42. FIG. 6 shows two transformers 82, 84 connected in series with the transducer element 42. Additional transformers may be connected. The transformers 82, 84 may comprise transformers with three or more separate flux paths as described above or other transformers. For example, a standard transformer generates a bipolar voltage output. One or two different primary windings are provided around one path such that current flows in opposite directions around the flux path for generating positive or negative amplitudes. Each transformer is operable to provide two or more states or voltage amplitudes as outputs on the secondary windings. As shown, one transformer 82 is operable to drive three states, such as associate with a zero voltage, a positive voltage and a negative voltage state. Also as shown, the other transformer 84 is operable to drive five states, such as associate with two different positive amplitudes, two different negative amplitudes and a zero voltage level. The transformers 82, 84 are capable of providing a same number of states in alternative embodiments. The number of amplitude levels at the multilevel transmit waveform provided to the transducer element 42 is a function of the number of states provided by the transformers 82, 84 in series. For example, the number of voltage states is a multiplication function of the number of states of the two transformers 82, 84. In the embodiment shown in FIG. 6, the three states of the transformer 82 and the five states of the transformer 84 provide 15 possible amplitude levels of the multilevel transmit waveform.

By connecting the secondary windings of the transformers 82, 84 in series, the voltage output by the transformer 82 is summed with the voltage provided by the transformer 84. A sum of the voltages is provided to the transducer element 42. Control signals for selecting particular states of the transformer 82, 84 are timed to provide the multilevel transmit waveform, such as the transmit waveform shown in FIG. 5 or other multilevel transmit waveforms.

Figure 7:
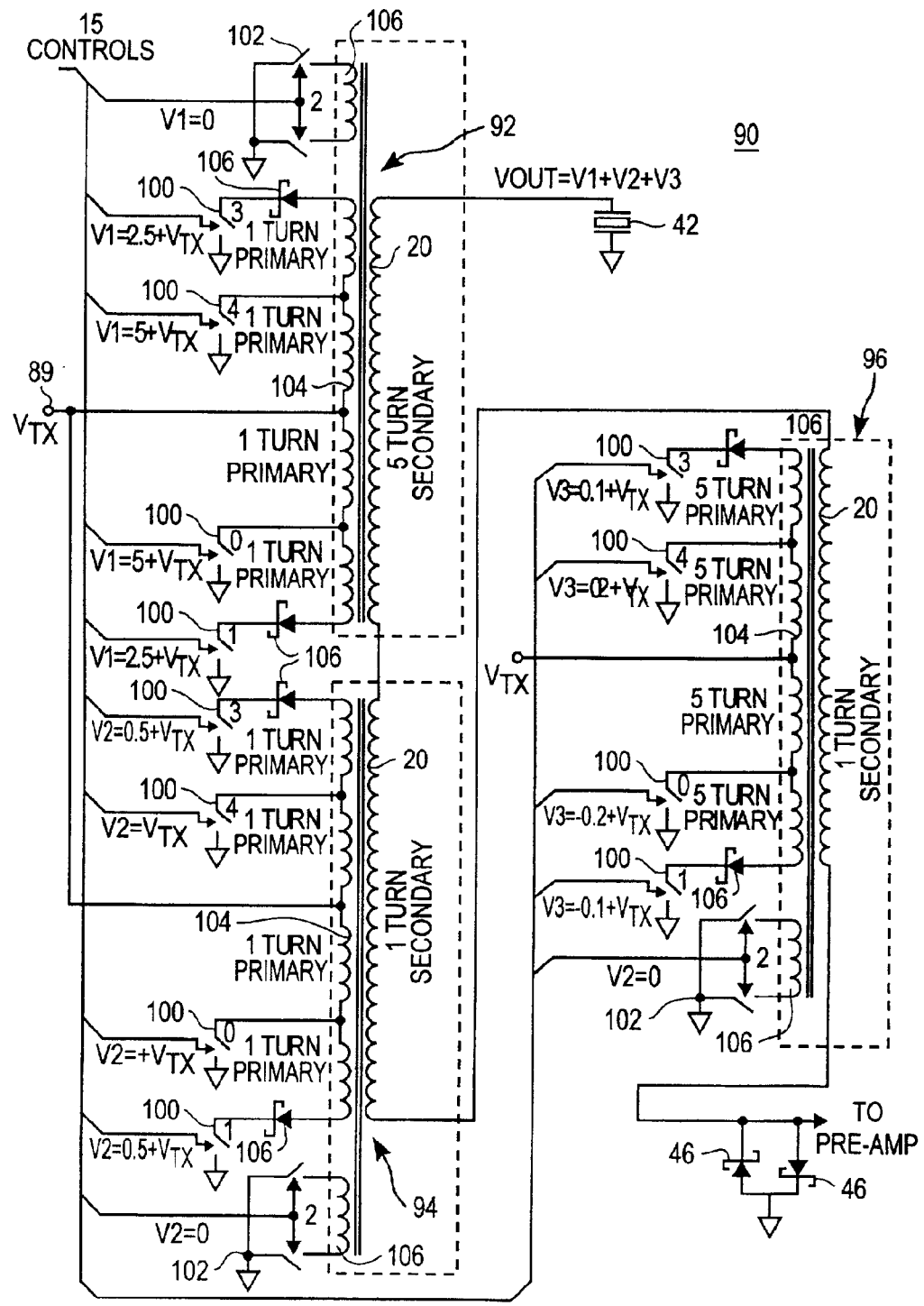
FIG. 7 is a circuit diagram of a transmitter and receiver circuit using series transformers of one embodiment.

FIG. 7 shows a transmitter and receiver circuit 90 for combining the outputs of multiple series connected transformers using turn-based scaling for generating multilevel transmit waveforms. The circuit 90 includes three transformers 92, 94 and 96, but additional or fewer transformers may be used. The circuit 90 also includes a voltage source 98, four single-pole control switches 100 for each of the transformers 92, 94 and 96, one double-pole zero voltage drive switch 102 (or two single-pole switches) for each of the transformer units 92, 94 and 96, receive diodes 46, and the transducer element 42. Additional, different or fewer components may be provided, such as providing one or more of the transformers 92, 94 and 96 without a zero drive switch 102, providing fewer or additional control switches 100, or providing fewer or additional transformers 92, 94 and 96.

The secondary windings 20 of each of the transformers 92, 94 and 96 are connected in series between the receiver section associated with the diodes 46 and the transducer element 42. Transformers 92, 94 and 96 include two different primary windings 104 and 106. One primary winding 106 is associated with the zero drive state and is wound around a same flux path as the other primary winding 104. The primary windings 104 are tapped at a center by the voltage source 98, but offset or non-centered taps from the voltage source 98 may be provided for one or more of the transformers 92, 94 and 96. The same voltage source 98 connects to each of the transformers 92, 94 and 96. In alternative embodiments, different voltage sources with the same or different voltage output are provided to each of the transformers 92, 94 and 96. Opposite ends of the primary winding 104 are connected to a switch 100, such as a transistor or other switch device through a diode 106. Additional diodes 106 may be provided, or diodes may be provided in a different location. The primary windings 104 are also tapped halfway (but unequal spacing may be used) between an end and the center on each side of the primary winding 104 by additional switches 100. The switches 100 are connectable to ground. In alternative embodiments, the secondary winding 20 and primary windings 104 correspond to a transformer as described above for FIG. 3.

The number of switches 100 tapped to the primary winding 104 determine the maximum number of states of each transformer 92, 94 and 96. Where four switches 100 are provided, a maximum of five output states are possible including a zero output level. A different positive or negative voltage output is generated by closing one of the switches 100. The single connection to ground generates a voltage from the voltage source 98 to the connected ground. Based on the tap locations of the switch 100 used for connecting to ground, a different voltage level is provided. As shown, a positive or negative maximum voltage and one-half of the maximum voltage positive or negative is provided as an output. For a zero voltage output, the switches 100 for a particular transformer 92, 94 and 96 are left open and the switch 102 is closed. The ground connection across the primary winding 106 on the flux path of the transformer 92, 94 or 96 drives a zero voltage state for that particular transformer 92, 94 and 96. As an alternative to a zero drive switch 102 in an associated primary winding 106, a diode bridge may be provided for isolating the transformer 92, 94, 96 for reception of echo signals.

Scaling the voltage contribution of transformers 92, 94 and 96 relative to each other is provided by the turns ratio of each transformer 92, 94 and 96. As shown in FIG. 7, the voltage output contribution provided by each of the transformers 92, 94 and 96 are scaled relative to each other by having different primary to secondary winding turn ratios. In yet other alternative embodiments, a different-voltage is provided as the voltage source for each of the transformers 92, 94 and 96 to scale the voltages. A combination of a different voltage level provided by the voltage source and different turns ratio may also be used. In an alternative embodiment, the same primary to secondary turns ratio is provided for each of the transformers 92, 94 and 96.

In FIG. 7 with a same voltage source 98 for each transformer 92, 94, 96, the transformer 92 provides one or two turns of the primary winding 104 for every five turns of the secondary winding 20, resulting in an output of five or 2.5 times the source voltage 98. The transformer 94 provides one or two turns of the primary winding 104 for every one turn of the secondary winding 20, resulting in an output of one or 0.5 times the source voltage 98. The transformer 96 provides five or ten turns of the primary winding 104 for every one turn of the secondary winding 20, resulting in an output of 0.2 or a 0.1 times the source voltage 98. The transformer 92 has a range of ten times the voltage of the voltage source 98 with a 2.5 times the voltage $V_{TX}$ step size between amplitudes. The transformer 94 provides a two $V_{TX}$ voltage with a step size of 0.5 $V_{TX}$. The least significant transformer 96 has a range of 0.4 $V_{TX}$ voltage with a step size of 0.1 $V_{TX}$. The circuit 90 is operable to provide 125 different peak voltage amplitude levels for the multilevel transmit waveform.

Fifteen control signals, one for each of the switches 100 and 102 control generation of the transmit waveform as a function of time. Binary control signals indicate whether a switch 100, 102 is open or closed. One switch is closed for one or more of the transformers 92, 94, 96 to provide a positive or negative scaled voltage.

One logic base four representation for operating the circuit 90 is provided as follows:

$$\text{Output voltage} = (A(2.5) + B(0.5) + C(0.1) - 6.2)V_{TX},$$

where A, B and C are values ranging from 0 to 4 corresponding to the switches 100 labeled as 0, 1, 2, 3, and 4 of FIG. 7. In response to each of the positive and/or negative voltages generated on the secondary windings 20 of the transformers 92, 94 and 96, a sum of the voltages is provided as one peak amplitude of a half cycle of a transmit waveform.

In one embodiment, positive voltages are provided on a subset of the transformers 92, 94 and 96 and negative voltages are provided on one or more of the other transformers 92, 94 and 96. Various combinations of all positive voltages, all negative voltages, positive and negative voltages, and 0 value voltages provide for a plurality of amplitudes for the transmit waveform. The scaling or winding ratios of the different transformers 92, 94 and 96 provide a higher resolution or finer adjustments of the amplitude levels of the transmit waveform.

While the invention has-been described above by reference to various embodiments, it should be understood that many changes and modifications can be made without departing from the scope of the invention. For example, each of magnetic flux superposition or voltage superposition from a series of transformers are provided individually or in combination for a transmitter and receiver circuit. Any of possible now, known or later developed switches, voltage sources, transformer cores, ultrasound transducer elements or control devices may be used.

It is therefore intended that the foregoing detailed description be understood as an illustration of the presently preferred embodiment of the invention, and not as a definition of the invention. It is only the following claims, including all equivalents, that are intended to define the scope of this invention.

What is claimed is:

1. A method for generating multiple level transmit waveforms, the method comprising:
   (a) applying a first voltage level in response to a first switch;
   (b) applying a second voltage level in response to a second switch; and
   (c) outputting a transmit waveform having at least three different non-zero peak amplitudes from a first transformer in response to (a) and (b) as a function of time.

2. The method of claim 1 wherein (a) comprises applying the first voltage on the first transformer, (b) comprises applying the second voltage on a second transformer in series with the first transformer.

3. The method of claim 2 wherein (c) comprises applying the transmit waveform to an ultrasound transducer element where the transmit waveform is responsive to a sum function of the first and second voltages.

4. The method of claim 3 wherein (a) comprises:
   (a1) providing a first primary winding of the first transformer, the fist primary winding tapped by at least a voltage source and three switches; and
   (a2) connecting one of the three switches to ground.

5. The method of claim 3 wherein (c) comprises generating the transmit waveform having at least four voltage levels, the at least four voltage levels responsive to first and second winding ratios of the first and second transformers, respectively, the first winding ratio different than the second winding ratio.

6. The method of claim 5 further comprising:
   (d) controlling the sum function as a function of base four control signals for each of the first and second transformers.

7. The method of claim 3 further comprising:
   (d) tapping first and second primary windings of the first and second transformers, respectively, with a same voltage source.

8. The method of claim 3 wherein (a) comprises generating the first voltage as a function of time and a maximum number of states of the first transformer, and (b) comprises generating the second voltage as a function of time and a maximum number of states of the second transformer, the maximum number of states of the first transformer different than the maximum number of states of the second transformer.

9. The method of claim 3 wherein (a) comprises generating a negative voltage and (b) comprises generating a positive voltage.

10. The method of claim 3 wherein (a) comprises generating the first voltage in response to a superposition of magnetic flux from first and second separate flux paths in a third flux path.

11. The method of claim 1 wherein (a) and (b) comprise generating the first and second voltages on first and second separate flux paths of the first transformer and (c) comprises outputting the transmit waveform from a secondary winding around a third flux path of the first transformer, the third flux path separate from the first and second flux paths.

12. The method of claim 1 wherein (a) and (b) comprise applying first and second voltages on first and second flux paths, respectively, of the first transformer, and (c) comprises generating a third voltage on a third flux path as a function of the first and second voltages.

13. The method of claim 12 wherein (c) comprises superposing magnetic flux from the first and second flux paths in the third flux path.

14. The method of claim 12 wherein the first and second voltages are ternary (+, −and 0).

15. The method of claim 12 further comprising:
   (d) applying a fourth voltage on a fourth flux path of the transformer;
   wherein (c) comprises generating the third voltage as a sum of the first, second and fourth voltages.

16. The method of claim 12 further comprising:
   (d) tapping a first primary winding around the first flux path to a first voltage source; and
   (e) closing one of first and second switches connected to opposite ends of the first primary winding.

17. The method of claim 12 further comprising:
   (d) connecting an untapped winding around the first flux path to ground when the first voltage is zero.

18. The method of claim 12 further comprising:
   (d) applying the first voltage in response to a first voltage source tapped to a first primary winding on the first flux path;
   (e) applying the second voltage in response to a second voltage source tapped to a second primary winding on the second flux path;
   wherein the first and second voltage sources are operable to output different voltages.

19. The method of claim 12 wherein (c) comprises summing or subtracting a first voltage and a second voltage.

20. The method of claim 12 wherein (c) comprises summing a zero value first voltage with the second voltage.

21. The method of claim 12 wherein (c) comprises generating the transmit waveform with at east eight different non-zero voltage levels.

22. The method of claim 1 wherein (c) comprises providing the at least three non-zero peak amplitudes as a function of both summing and subtracting the first and second voltages.

23. The method of claim 1 wherein (b) comprises applying the second voltage with a different polarity than the first voltage and wherein (c) comprises outputting the transmit waveform where at least one of the at least three non-zero peak amplitudes is responsive to the first voltage and the second voltage with the different polarity.

* * * * *